(12) United States Patent
Hubert et al.

(10) Patent No.: US 11,761,367 B2
(45) Date of Patent: Sep. 19, 2023

(54) SHIELDING ELEMENT

(71) Applicant: ElringKlinger AG, Dettingen/Erms (DE)

(72) Inventors: Andreas Hubert, Dettingen/Erms (DE); Peter Schölzel, Dettingen/Erms (DE)

(73) Assignee: ElringKlinger AG, Dettingen/Erms (DE)

( * ) Notice: Subject to any disclaimer, the term of this patent is extended or adjusted under 35 U.S.C. 154(b) by 0 days.

(21) Appl. No.: 17/627,784

(22) PCT Filed: Jul. 16, 2020

(86) PCT No.: PCT/EP2020/070234
§ 371 (c)(1),
(2) Date: Jan. 17, 2022

(87) PCT Pub. No.: WO2021/009329
PCT Pub. Date: Jan. 21, 2021

(65) Prior Publication Data
US 2022/0325653 A1 Oct. 13, 2022

(30) Foreign Application Priority Data
Jul. 16, 2019 (DE) .......................... 102019119294.3

(51) Int. Cl.
*F01N 13/14* (2010.01)
*H05B 3/42* (2006.01)
*F01N 13/18* (2010.01)

(52) U.S. Cl.
CPC ............. *F01N 13/148* (2013.01); *H05B 3/42* (2013.01); *F01N 13/1888* (2013.01)

(58) Field of Classification Search
CPC ........ F01N 3/027; F01N 3/2013; F01N 13/14; F01N 13/148; F01N 2240/16; H05B 3/283; H05B 3/48
See application file for complete search history.

(56) References Cited

U.S. PATENT DOCUMENTS 3,886,739 A * 6/1975 Lee ....................... F01N 3/2846
60/300
4,456,457 A 6/1984 Nozawa et al.
(Continued)

FOREIGN PATENT DOCUMENTS

DE 19602287 A1 8/1996
DE 202007007849 U1 10/2008
(Continued)

OTHER PUBLICATIONS

Machine translation of DE-202007007849-U1, accessed Jan. 14, 2023. (Year: 2023).*
(Continued)

*Primary Examiner* — Jonathan R Matthias

(57) ABSTRACT

A shielding element, which comprises at least two sections that are embodied to be linearly connected to each other in abutting fashion on at least one contact surface so as to enclose a three-dimensionally shaped profile or pipe segment of an exhaust line of an internal combustion engine over a certain length when in use. In order to modify a shielding element of the above-mentioned type while amplifying its effect with other positive properties, it is proposed for the sections of the shielding element to each comprise at least one electrical heating system, which, in an installed position, is thermally directed at the pipe segment that is to be enclosed.

12 Claims, 2 Drawing Sheets

(56) References Cited

U.S. PATENT DOCUMENTS

| | | | |
|---|---|---|---|
| 4,979,364 A | 12/1990 | Fleck | |
| 5,318,108 A * | 6/1994 | Benson | F01N 5/02 |
| | | | 165/96 |
| 2008/0169038 A1 | 7/2008 | Sellis et al. | |
| 2013/0259754 A1 | 10/2013 | Murata et al. | |
| 2014/0290228 A1 * | 10/2014 | Sugiura | B32B 5/06 |
| | | | 112/420 |
| 2015/0267596 A1 * | 9/2015 | Tobben | F01N 3/2066 |
| | | | 60/274 |

FOREIGN PATENT DOCUMENTS

| | | | |
|---|---|---|---|
| DE | 202016102418 U1 * | 9/2017 | ......... B60R 13/0876 |
| DE | 102018117049 A1 | 1/2020 | |
| EP | 1702803 B1 | 4/2012 | |
| EP | 2657477 B1 | 10/2013 | |
| WO | 2019002181 A1 | 1/2019 | |

OTHER PUBLICATIONS

Machine translation of DE-202016102418-U1, accessed Jan. 14, 2023. (Year: 2023).*

* cited by examiner

SHIELDING ELEMENT

FIELD OF THE INVENTION

The present invention relates to a shielding element, which comprises at least two sections that are embodied to be connected to each other in abutting fashion on at least one contact surface so as to enclose a three-dimensionally shaped profile or pipe segment of an exhaust line of an internal combustion engine over a certain length when in use.

BACKGROUND OF THE INVENTION

Various approaches for positioning a shielding element as a closed casing or envelope around a profile are known from the prior art. In addition to a use of split sleeves and segmented shielding elements in the form of half-shells or partial shells, a shielding element according to EP 1 702 803 B1 has proven to be particularly valuable, the disclosure of which is included herein by reference. A shielding element that is constructed in this way is used to thermally shield comparatively hot zones of an exhaust line—preferably in the region close to an internal combustion engine—from neighboring segments and/or units. Even cross-sectional contours that deviate from the circular can be enclosed quickly and reliably in one installation step.

The constant, uninterrupted trend toward the compact design of motor vehicle drives with internal combustion engines creates preferred application zones for such a shielding element along various segments of an exhaust line, from a manifold that can be heated to up to approx. 1,100° C., to turbochargers, to catalytic converters. In this connection, a shielding element of the above-mentioned type, either installed in production or during repairs, in addition to having a low dead weight, is also very advantageous due to its good manageability, requiring the use of only a very few tools or other aids.

In addition, it is also known, alternatively or in addition to the thermal damping, to embody a shielding element to damp an acoustic emission, particularly through an embodiment of an outer surface and/or an internal structure and material of a filling. The shielding element is then alternatively or additionally used for reducing noise pollution, e.g. by means of a wavy and/or nubby outer surface. In the following, no further distinction will be drawn between a shielding element with thermal damping and/or one with acoustic damping.

SUMMARY OF THE INVENTION

The object of the present invention is to modify a shielding element of the above-mentioned type while amplifying its effect with other positive properties.

This object is attained according to the invention in that the sections of the shielding element each comprise at least one electrical heating system, which, in an installed position, is thermally directed at the profile that is to be enclosed. A shielding element, which is already known and is used as a finished component in an exhaust line, is enhanced according to the invention by adding the possibility of performing a selective heating in a region that has a heating system. Whereas known shielding elements were only able damp an emission of heat and/or noise, according to the invention, a known component that is generally already present is used to additionally achieve the possibility, in a region defined by a heating system, to selectively heat a profile that encloses a pipe segment regardless of the cross-sectional shape thereof. In a way that is familiar to the person skilled in the art, a heating system can be easily controlled electrically by supplying power to it from the electrical system of the vehicle so that a desired temperature can be reliably set. This combination yields an advantageous union of a damping shielding element and an electric heater provided therein.

Advantageous modifications are also presented. Correspondingly, two sections are connected to each other via at least one bending line. This can significantly simplify an installation since a number of sections is reduced and their orientation to one another is also predetermined in a clearly identifiable way during installation.

In a preferred embodiment of the invention, the bending line in the shielding element is embodied as an omega-shaped fold. In addition to a low mechanical resistance when the shielding element is being closed during installation, a fold of this kind also creates additional space for safely accommodating and protecting, for example, electric supply lines of the electrical heating system.

According to a significant modification of the invention, the heating system is embodied as a resistance conductor that is electrically insulated from the profile and is provided with a meandering path that extends over a certain length. In comparison to other conductive structures such as flat conductors or conductor networks, wires generally have the advantage of good deformability during the formation of a 3D structure. A meandering path of a heating wire achieves a homogenization of an introduction of heat and thus the most uniform possible distribution over an area, which is influenced to only a negligible degree by the deformability of the structure.

Preferably, the resistance conductor is encased with an electrical insulation. This prevents an electrical short circuiting via the pipe segment, even if the resistance conductor is positioned directly on a surface of the generally metallic pipe segment in order to improve heat transmission.

In a modification of the invention, this insulation of the resistance conductor is embodied in the form of a meshwork, crochet, woven, or knit. For the insulation, fibers made of a material that exhibits good electrical insulation or made of a mixture of high thermal resistance materials are provided, with a thickness of 0.1 to 0.6 mm. Alternatively or in addition, the electrical insulation of the resistance conductor is embodied as a ceramic coating, in particular as a coating that is produced by immersion in an emulsion or by spray application and is then thermally hardened.

The resistance conductor together with an electrical power supply connected to it must be designed so that it is able to heat an adjacent pipe, which is part of an exhaust line, through the electrical insulation to a temperature from approx. 200° to more than 550° C. As a result, an exhaust that is conveyed through this pipe can also be heated to a temperature that is greater than a limit temperature above which a subsequent catalytic converter situated downstream can effectively function during a cold start of the internal combustion engine. It is thus also possible to comply with even strict emission limits.

Preferably, the heating system of the section is affixed in or to a thermal damping of the shielding element; in a direction opposite from a pipe segment that is to be enclosed, i.e. toward the outside, the damping comprises fibers with poor thermal conductivity, in particular mats composed of glass and/or ceramic fibers. This improves a heat flow from the heating system into the pipe segment that is to be heated.

In a preferred embodiment of the invention, the affixing of the heating system is embodied by means of sewing, needling, and/or stapling of a heating system in, to, or with the fibrous material of the thermal damping.

Advantageously, at least one branch of the electrical heating system is affixed in one of several partial shells of the shielding device that are connected to one another in articulating fashion. In an installation position, the electrical heating system encloses the respective segment of the exhaust line without requiring the heating system to be wound around this segment. As an integral component of a shielding element, the electrically insulated resistance conductor is simply secured and closed around the relevant pipe segment by the shielding element.

According to a modification of the invention, several heating systems of a section of the shielding element are provided and/or cascades of a thermal output are provided within each heating system. These cascades of the thermal output are embodied by means of deactivatable heating systems in a section of the shielding element and/or deactivatable resistance branches within a heating system.

In one embodiment of the invention, in order to adjust a respective heating power to be output, means are provided for switching and regulating a current flow through the electrical heating system, in particular electronic switches for producing a pulse-width modulation of the current through selected branches of the electrical heating system.

According to the invention, an electrical heating system is to be integrally embedded into a shielding device so that it can be reliably and simply positioned on a segment of an exhaust line and can also be retrofitted thereon. A shielding element of this kind is constructed using a thermal damping sleeve so that in an installed position, a good thermal contact with sufficient electrical insulation relative to the relevant segment of the exhaust line is produced for the electrical heating system. It is thus possible in a simple and reliable way to achieve configurations such as the one disclosed in DE 10 2018 117 049 A1.

BRIEF DESCRIPTION OF THE DRAWINGS

Other features and advantages of embodiments according to the invention will be explained in greater detail below with reference to exemplary embodiments based on the drawings. In the schematic drawings.

DETAILED DESCRIPTION OF THE PREFERRED EMBODIMENTS

Figure 1:
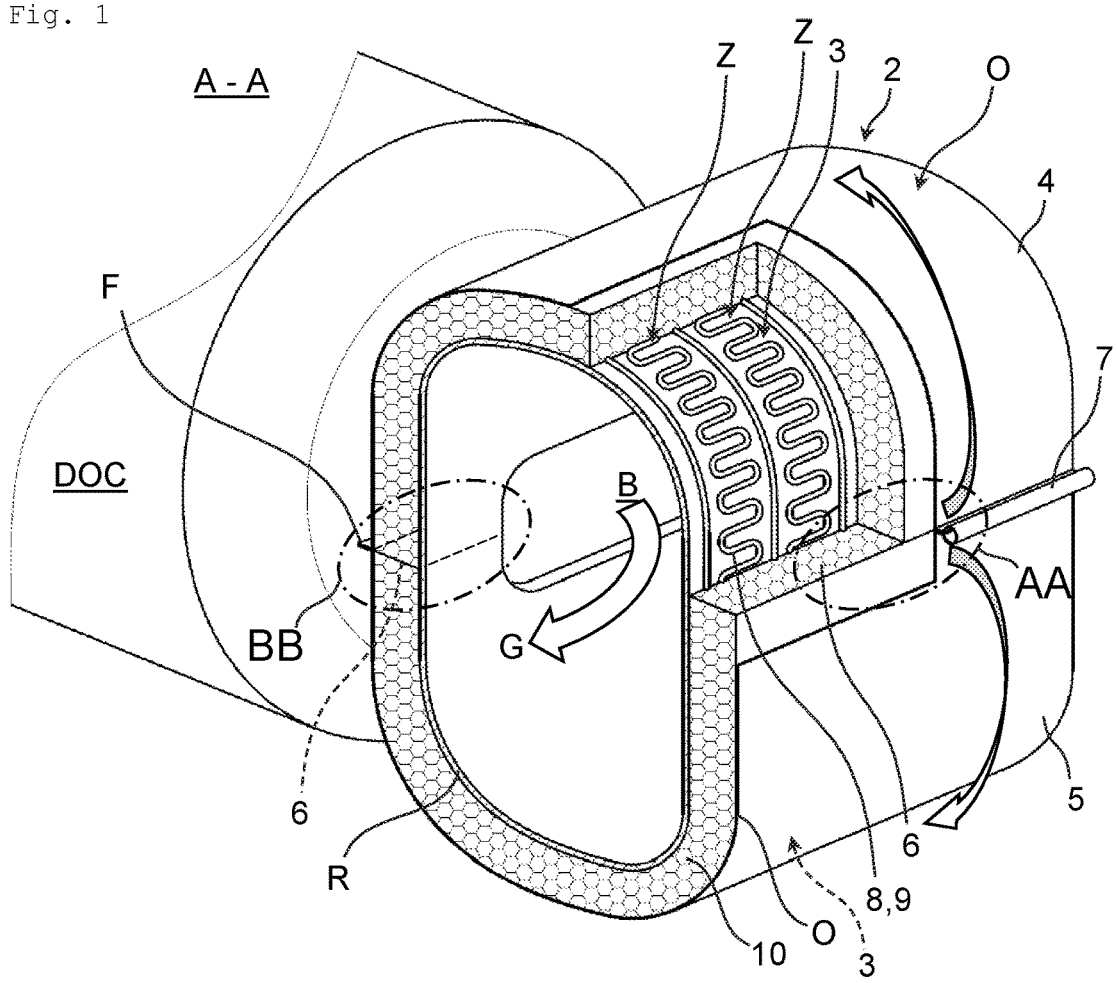
FIG. 1: shows a perspective depiction of a shielding element in an installed position, cut along a plane A-A.

The same reference numerals are always used for the same elements throughout the different drawings. Without limiting the invention, only a use of the shielding elements according to the invention as part of an exhaust line of a diesel internal combustion engine of a motor vehicle is depicted and described below. It is, however, clear to the person skilled in the art that in the same way, an adaptation to other applications with an advantageously regulated temperature control throughout an enclosed shaped profile or component is possible, particularly in an exhaust line of a gasoline engine, or in subregions of alternative drives and other applications in which a desired temperature must be achieved within a very short time and/or maintained and at the same time, a damping is to be provided relative to the respective surroundings.

Figure 4:
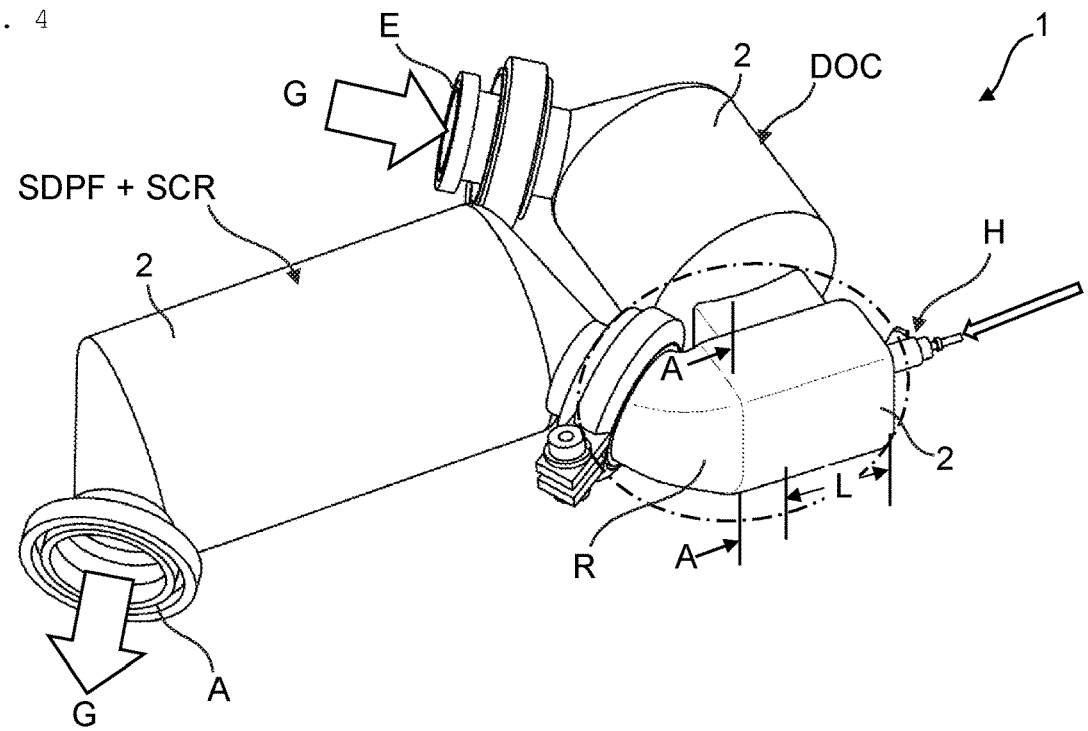
FIG. 4: shows a perspective depiction of a segment of an exhaust line of a compactly designed diesel internal combustion engine known from the prior art with the sectional plane A-A in order to depict an embodiment of the shielding element in FIG. 1.

In a simplified depiction, FIG. 4 shows a perspective view of a segment of an exhaust line 1 of a diesel internal combustion engine known from the prior art in a compact design of the kind that is currently used, for example, in a 2.0 liter diesel internal combustion engine according to the Euro 6 standard in passenger vehicles. In order to thermally protect adjacent units and to reduce noise emission, this segment is already completely enclosed with shielding elements 2 whose visible outer surfaces O are structured in a manner that is now shown in greater detail in order to reduce noise emission. In the flow direction of an exhaust flow G in the depicted segment of the exhaust line 1, between the system limits of an inlet E and an outlet A, the flow passes in succession through a diesel oxidation catalyst DOC, a urea injection H with a corresponding measurement sensor system, and a subsequent mixing chamber in a pipe segment R, and a combination of a diesel particulate filter SDPF coated with a selectively reducing catalyst and a selectively reducing catalyst SCR in extremely close proximity to one another.

In the course of testing, it has surprisingly turned out that the pipe segment R or mixing chamber encompassed by a dot-and-dash line here, as a repository for the urea injection H, is particularly important to a pollutant emission reduction, particularly during a cold start of the motor vehicle. Connected downstream of the diesel oxidation catalyst DOC and upstream of the diesel particulate filter SDPF that is coated with a selectively reducing catalyst, a part of this pipe segment R—only on the outside and for a certain length L—is provided with at least one electrical heating system 3 in order to bring an exhaust flow G to a minimum temperature of approx. 200° C. that is necessary for a subsequent denitrification through the use of urea. This avoids any change inside either the depicted exhaust line or even only a section thereof. The new functionality of the selective heating ability has been transferred into the shielding element 2 that is already present.

In an enlarged detail from FIG. 4, FIG. 1 shows a cut-away perspective depiction of an exemplary embodiment of a correspondingly enhanced shielding element 2 in an installed position. In order for the pipe segment R with a cross-sectional contour that deviates sharply from the circular to be enclosed by the damping shielding element 2 in a way that is suitable for mass production, the shielding element 2 in this case is composed of two sections 4, 5, which are connected to each other as half-shells and each support an electrical heating system 3. These sections 4, 5 are formed so that in the individual application shown, they are connected to each other in abutting fashion at contact surfaces 6 and completely enclose the three-dimensionally shaped pipe segment R. As a result, a number of heating systems 3 that corresponds to the number of sections 4, 5 then also encloses the pipe segment R without requiring the pipe segment R to be wound, for example, with a resistance wire, etc. A winding around the outside of the pipe segment R would be impossible to achieve reliably and within an acceptable production time. An internal installation is not an option because it would constitute an intervention into components in an existing system that have been made by different manufacturers and matched to one another. Without interventions into the above-described system, the attachment of sections 4, 5 equipped with heating systems 3 in this exemplary embodiment of a shielding element 2 does not differ from a previously known installation of a damping shielding element 2 on the shielding line 1.

In the shielding element 2 in FIG. 1, in the region of one of the two contact surfaces 6, the outer surface O of the shielding element 2 transitions into a bending line 7 through which the half-shell sections 4, 5 are joined to each other in articulating fashion by means of an omega-shaped fold 7 serving as a hinge. The fold 7 is characterized by a low mechanical bending resistance as the shielding element 2 is being closed around the pipe segment R during installation and also creates additional space for safely accommodating and protecting, for example, electric supply lines of the heating systems 3, which is not graphically depicted in greater detail here. Opposite from the fold 7, in a region of the contact surface 6 at the outer surface O, a flange F is embodied for purposes of securely affixing the shielding element 2 when it is in the state in which it has been closed around the pipe segment R.

The contact surfaces 6 in this exemplary embodiment all lie in a plane that also extends centrally through the inlet and outlet regions B of the pipe segment R. This plane thus constitutes a mirror symmetry plane of the shielding element 2; in the particular case shown, the sections 4, 5 are thus embodied as half-shells that are mirror-symmetrical to each other.

Each of the half-shell sections 4, 5 comprises several branches Z embodied as separately switchable parts of the electrical heating system 3, which in a completely installed position, is oriented toward the profile or pipe segment R to be enclosed, in order to provide an intensive introduction of heat. Each branch Z of the heating system 3 comprises at least one resistance conductor 8 that is electrically insulated relative to the pipe segment R, with a part or segment having a meandering path extending over a certain length L in the flow direction of the exhaust flow G. To this end, the resistance conductor 8 is enclosed by an electrical insulation 9 in the form of a meshwork, which consists of a temperature-resistant glass and/or ceramic fiber. To improve a heat transmission from the resistance conductor 8 into the pipe segment R, the electrical insulation 9 is selected to be as thin as possible.

In order to durably prevent a displacement, even of only subregions of the resistance conductor 8 or parts of a branch Z, the heating system 3 and more specifically its branches in the sections 4, 5 is/are affixed in and/or to a thermal damping 10 of the shielding element 2. The affixing of the heating system 3 is embodied by means of sewing, needling, and/or stapling in and/or to the thermal damping 10 of the section 4, 5 of the shielding element 2. In one exemplary embodiment, the resistance conductor 8 resting on the thermal damping 10 is covered by a seam or overstitched, so to speak, along its central axis. In another exemplary embodiment, even an overstitching only at certain points is sufficient so that a seam lies essentially perpendicular to the meandering path of the resistance conductor 8. By means of an electrical insulation 9 of the resistance conductor 8 consisting of fibers, however, it is also sufficient for there to be an indirect affixing of the resistance conductor 8 by virtue of the insulation 9 consisting of fibers being affixed to the thermal damping 10, e.g. by means of a kind of felting. Specifically, when producing a damping in the form of a shaped part that is also mechanically resilient, in an embodiment that is not shown in greater detail, the thermal damping 10 and the at least one resistance conductor 8 with fiber insulation 9 are wet together by means of an emulsion 0.1 to 0.6 mm thick of the insulation layer and are connected to each other by means of a ceramic structure that is produced by a tempering that follows a shaping.

Figure 2:
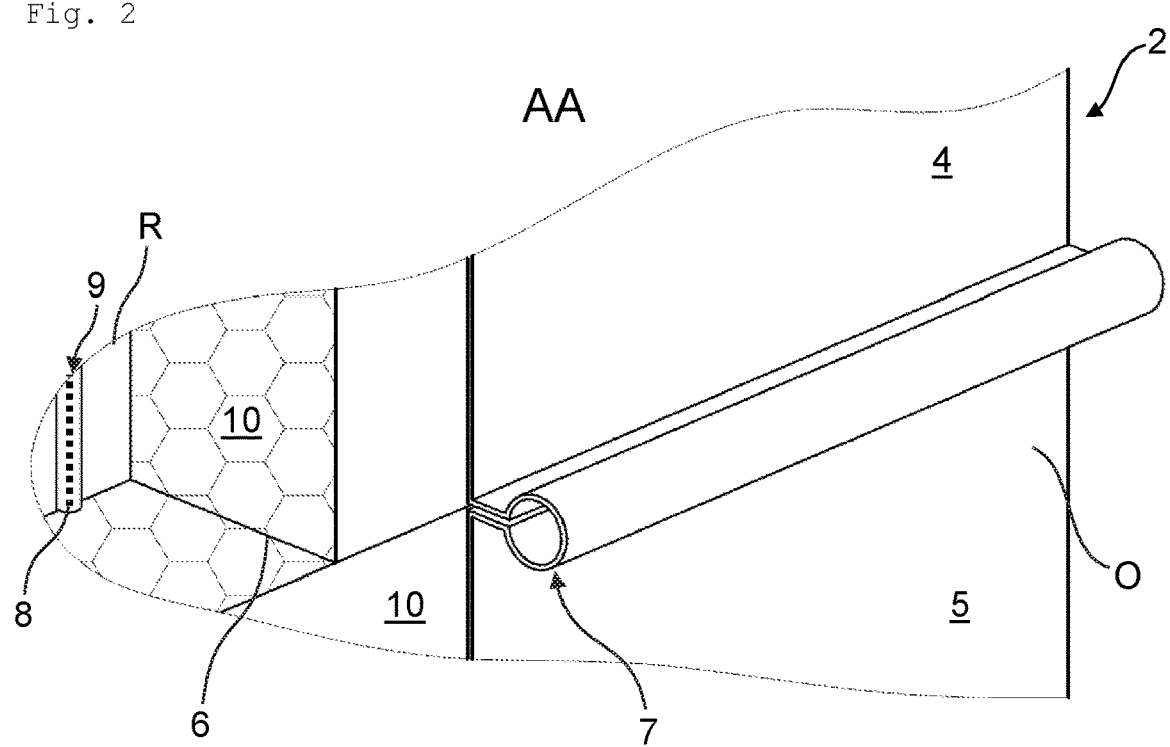
FIG. 2: shows an enlargement of a detail AA from FIG. 1.

FIG. 2 is an enlargement of a detail AA from FIG. 1. The drawings in FIGS. 1 and 2 show a schematic design of a one-piece shielding element 2 with adjoining branches Z of the heating system 3, which are connected to each other in articulating fashion by means of the omega fold 7. Due to its construction, the omega fold 7 compels the formation of a butt joint of the two parts of the thermal damping 10 and thus closes an otherwise possible heat sink. At the same time, the omega fold 7 creates a space in which supply lines, not shown in detail here, to the respective branches Z of at least the associated heating system 3 are enclosed and securely routed.

Opposite from this omega fold 7 in the installed state, there is another contact surface 6. After being installed during production, this contact surface 6 is closed around the pipe segment R and connected in a mechanically durable way, for example by means of welding, clinching, clamping, gluing, or the like.

Figure 3:
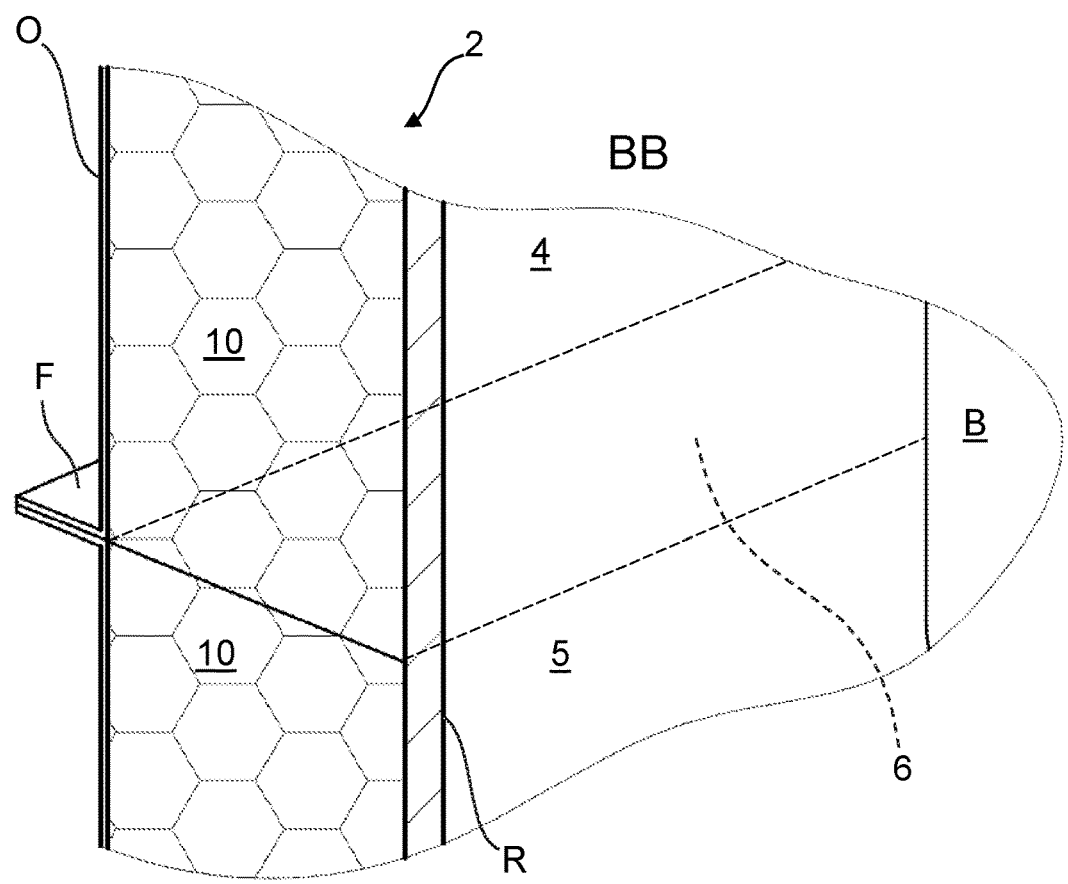
FIG. 3: shows an enlargement of another detail BB from FIG. 1.

FIG. 3 shows an enlargement BB of another detail from FIG. 1. This device, however, can also be used in a two-part and multipart shell system in which after the assembly, adjacent contact surfaces 6 extending flatly outward as flanges F at the outer surface O are likewise mechanically connected in a durable fashion in the above-indicated way.

A shielding element 2 described above can be designed for use at temperatures of up to 900° C. and where necessary, can also be at least temporarily exposed to temperatures beyond this up to approx. 1,500° C. In the exemplary embodiment described above, the integrated heating system 3 has an electrical heating power of approx. 1.5 kW to 5 kW with a supply voltage of 12 V or 48 V. With regard to its cross-sectional area, the shielding element 2 can have an extremely free form with diameters of 20 mm to 500 mm. A total length L to be heated should be <1,000 mm. A thermal damping 10 has a layer thickness of approx. 5 mm and is enclosed by a metallic outer surface made of stainless steel or aluminum approx. 0.4 mm thick. The metallic outer surface is provided with an embossed structure in order to establish a particular acoustic property.

As a rule, a system according to the invention is mounted with multiple parts in a symmetrical arrangement. For example, this is possible by means of partial shells, as has been described above. In addition to an embodiment with two separate half-shells, in some applications, it is also possible to achieve an integral embodiment, which connects more than two partial shells on the other side of the contact surface 6 to one another, e.g. by means of several omega folds functioning as a joint or hinge according to the teaching of EP 1 702 803 B1 in an essentially straight or linear fashion and with only a slight deviation in shape.

It is therefore possible, with simple assembly, for various regions over an entire exhaust line 1, before and/or around catalytic converters, to be electrically heated separately and in a way that allows them to be controlled independently of one another. This assembly can take place in successive segments, which are then connected to one another in a known way, as a rule by means of clamps that also permit attachment to the undercarriage of a vehicle. This retrofitting can also be carried out on an already-existing exhaust line and with an advantageously almost unchanged installation on the exhaust line itself, requires no structural changes to the exhaust line. In these exemplary embodiments, it is only necessary to externally provide switching and control elements for adjusting and regulating an electric power that is to be respectively provided and to distribute it to branches Z with ohmic heating resistors or heating wires.

The invention claimed is:

1. A shielding element, comprising at least two sections that are embodied to be connected to each other in abutting fashion on at least one contact surface so as to enclose a three-dimensionally shaped profile or pipe segment of an exhaust line of an internal combustion engine over a certain length when in use,
   wherein the at least two sections of the shielding element each comprise at least one electrical heating system, which, in an installed position, is positioned proximate to and thermally directed at the three-dimensionally shaped profile or pipe segment that is to be enclosed, and
   wherein the at least one heating system includes at least one resistance conductor provided with an electrical insulation that electrically insulates the at least one resistance conductor relative to the three-dimensionally shaped profile or pipe segment, with a meandering path extending over a certain length in a flow direction of exhaust.

2. The shielding element according to claim 1, wherein the at least two sections are connected to each other via at least one bending line.

3. The shielding element according to claim 2, wherein the at least one bending line is embodied as an omega-shaped fold.

4. The shielding element according to claim 1, wherein the electrical insulation of the at least one resistance conductor is crochet, woven, meshwork, or knit.

5. The shielding element according to claim 1, wherein for the electrical insulation of the at least one resistance conductor, fibers are provided, which are composed of glasses, silicates, or a mixture of high-performance thermal materials, and the electrical insulation is a layer with a thickness of approx. 0.1 to approx. 0.6 mm.

6. The shielding element according to claim 1, wherein the at least one resistance conductor together with an electrical power supply connected to the at least one resistance conductor is embodied to heat an adjacent pipe segment of an exhaust line through the electrical insulation to approx. 200° to more than 550° C.

7. The shielding element according to claim 1, wherein the heating system of each of the at least two sections is affixed in and/or to a thermal damping of the shielding element.

8. The shielding element according to claim 7, wherein the affixing of the heating system in and/or to the thermal damping of the section of the shielding element is achieved by sewing, needling, and/or stapling.

9. The shielding element according to claim 1, wherein at least one branch of the electrical heating system is affixed in one of several partial shells of the shielding device that are connected to one another in articulating fashion.

10. The shielding element according to claim 1, wherein several heating systems of a section of the shielding element are provided and/or a cascade of a respective thermal output is provided within each heating system through the inclusion of deactivatable heating systems and/or deactivatable branches of the heating system.

11. The shielding element according to claim 1, wherein in order to adjust a respective heating power to be output, electronic switches are provided for switching and regulating a current flow through the electrical heating system.

12. The shielding element according to claim 1, wherein in a region of a contact surface at an outer surface, a flange is embodied for purposes of securely affixing the shielding element when the shielding element has been closed around the three-dimensionally shaped profile or pipe segment.

* * * * *